(No Model.)
E. B. COOPER.
PYROMETER.
No. 430,271. Patented June 17, 1890.
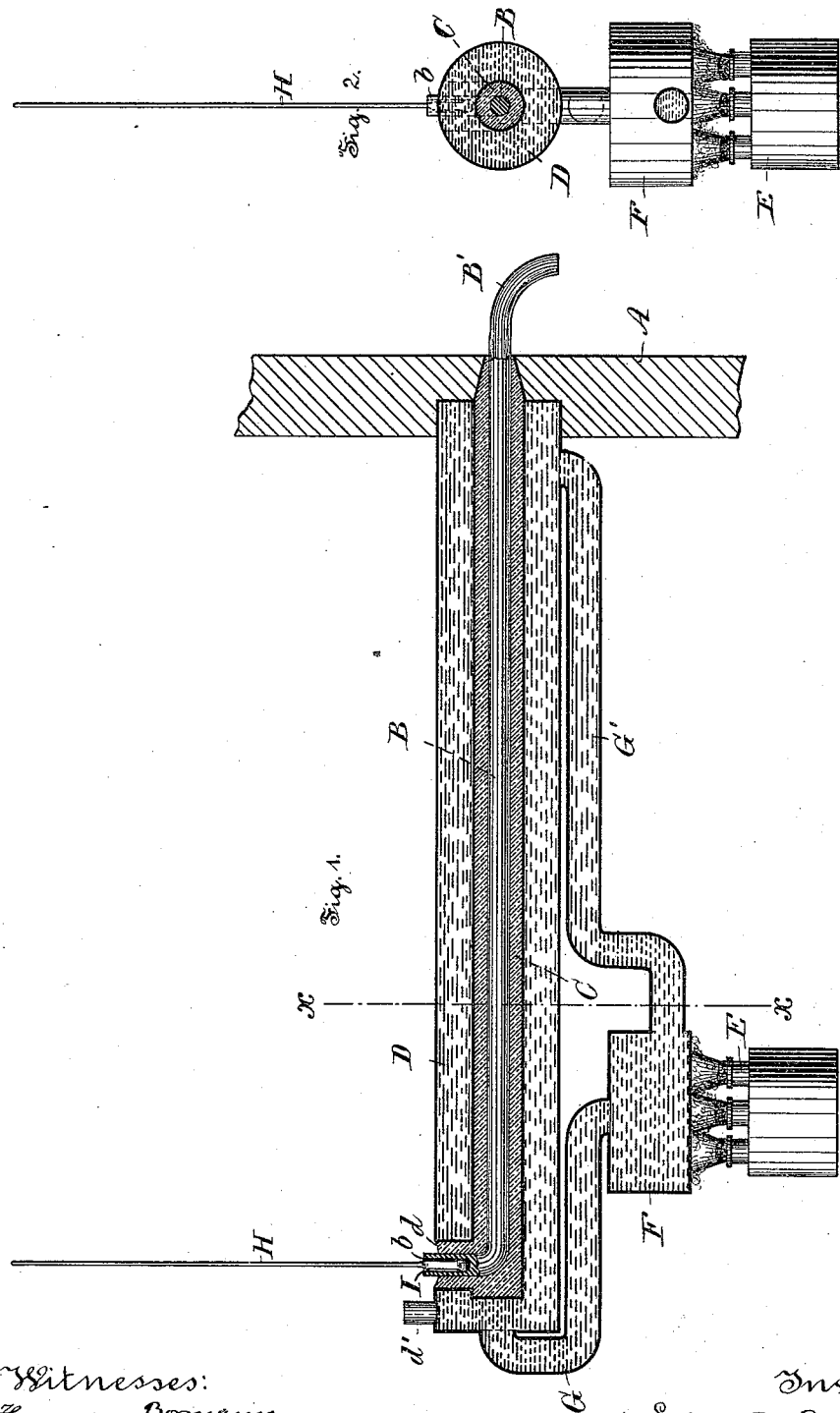
Witnesses:
Hermann Bormann
Thomas M. Smith
Inventor:
Edward B. Cooper
by
Augustus B. Stoughton
Att'y

UNITED STATES PATENT OFFICE.

EDWARD B. COOPER, OF PHILADELPHIA, PENNSYLVANIA.

PYROMETER.

SPECIFICATION forming part of Letters Patent No. 430,271, dated June 17, 1890.

Application filed November 20, 1889. Serial No. 330,974. (No model.)

*To all whom it may concern:*

Be it known that I, EDWARD B. COOPER, a citizen of the United States, residing at Philadelphia, in the county of Philadelphia and State of Pennsylvania, have invented a new and useful Pyrometer, of which the following is a specification.

Heretofore pyrometers other than those electrical have been constructed according to one of the following general types: first, those in which the expansion or contraction of a metal bar exposed to the heat to be measured was magnified by means of levers and actuated an indicator; second, those in which the expansion of atmospheric air and vapors when exposed to a high temperature actuated a recording mechanism, and, third, those in which a current of fluid of constant initial temperature was exposed for a short time to the action of the heat to be measured, and in which the change in the temperature of said fluid was measured.

In my invention use is made of a bar of conducting material exposed at one end thereof to the temperature to be measured, and provided at the other end thereof with a device for measuring temperature—for example, an ordinary mercurial thermometer. The rise of temperature indicated by the thermometer or other device for measuring temperature secured to one end of the bar or rod will be proportional to the rise or increase of temperature at the other or exposed end of the bar or rod. The higher this degree of temperature the greater the amount of heat conducted through the bar, and the greater the rise of temperature indicated by the thermometer or other device for measuring heat.

The principal object of my present invention is to provide an accurate, sensitive, and durable instrument for measuring temperatures higher than the boiling-point of mercury; but it may be applied in whole or in part to the measurement of lower temperatures whenever required.

The nature and objects of my invention will be more fully understood from the following description, taken in connection with the accompanying drawings, in which—

Figure 1 is an elevation, partly in section, illustrating the characteristic features of my invention; and Fig. 2 is a transverse section on the line $x\ x$ of Fig. 1.

Referring now to the accompanying drawings, A is a portion of the wall or side of a furnace, flue, or kiln.

B is a bar or rod of heat-conducting material, as copper, turned upward at one end thereof and having a cup-shaped cavity $b$ formed therein. In the practical application of my invention I have found that the end of this heat-conducting bar or rod is when exposed to a high temperature apt to be fused thereby. Therefore I prefer to weld or otherwise secure to this bar or rod a cap or extension B' of material whose fusing-point is higher than the temperature to be measured, and to expose this cap or extension to the high degree of heat, instead of the end of the bar or rod.

C is an envelope, of asbestus or other preferred non-conductor of heat, surrounding the portion of the bar or rod B which extends outside of the wall A.

D is a water or other jacket provided with a vent-hole $d'$, of usual construction, and with an aperture $d$.

E is a lamp of usual or other preferred construction.

F is a tank or vessel for heating a liquid. G and G' are tubes or pipes communicating with the interior of the jacket D and vessel F.

H is a thermometer having the bulb thereof in the recess or cup-shaped aperture $b$ of the rod B.

I is a heat-conducting substance, as mercury, placed in the recess $b$ around the bulb of the thermometer H, in order to afford a good heat-conducting medium between the bar or rod and the bulb of the thermometer.

It may be remarked that care should be exercised to have the end of the bar or rod B extend upward through the aperture $d$; and, furthermore, in order to obviate undue heating of the thermometer and of the extremity of the bar or rod by the liquid contained in the jacket, I form a gasket or coating of asbestus, if that was the material used, between the extremity of the rod or bar and the sides of the aperture $d$.

In use the jacket D is screwed or otherwise fitted into the furnace-wall, and the extension or cap B' of the rod or bar B extends into the interior of the furnace.

In order to ascertain the temperature of the interior of the furnace or flue, it is only necessary to consult the thermometer H. The higher it stands the higher the degree of heat to which the extension or cap B' is exposed, provided the other conditions remain the same. The principal one of the other conditions is the radiation of heat from the portion of the rod or bar B which is exposed to the atmosphere.

By a series of experiments I have found that the radiation of heat from the portion of the rod or bar B which is exposed to the atmosphere may be reduced to a minimum and maintained constant by covering the whole rod, except the extremity which is exposed to the temperature to be measured, with asbestus or equivalent material and surrounding this latter covering with a double casing containing a liquid, as water, maintained at the temperature of its boiling-point, or at any preferred constant temperature. The position at which the mercury stands in the thermometer H for two or more known temperatures applied to the cap or extension B' may then be ascertained experimentally and the corresponding temperatures for other positions be calculated therefrom.

It is obvious that portions of the invention may be used separately and that modifications may be made in details.

Having thus described the said invention and the manner of carrying the same into operation, what I claim as new, and desire to secure by Letters Patent, is—

1. In a pyrometer operating by conduction of heat, the combination, with a heat-conducting bar or rod, of a thermometer contacting with said bar or rod, substantially as and for the purposes set forth.

2. In a pyrometer operating by conduction of heat, the combination, with a heat-conducting bar or rod, of a thermometer contacting therewith and a cap or extension secured thereto, substantially as and for the purposes set forth.

3. In combination, a heat-conducting bar, a thermometer contacting therewith, and a jacket surrounding a portion of said bar and adapted to control the radiation of heat therefrom, substantially as and for the purposes set forth.

4. In combination, a heat-conducting bar or rod, a thermometer contacting therewith, a cap or extension secured thereto, and a water-jacket enveloping a portion of said bar or rod and adapted to prevent radiation of heat therefrom, substantially as and for the purposes set forth.

EDWARD B. COOPER.

Witnesses:
GEO. W. REED,
HERMANN BORMANN.